July 23, 1968  L. LARSSON  3,393,572
VARIABLE PULLEY

Filed March 16, 1966  3 Sheets-Sheet 1

INVENTOR.
LARS LARSSON
BY
Young + Thompson
ATTYS.

July 23, 1968  L. LARSSON  3,393,572
VARIABLE PULLEY
Filed March 16, 1966  3 Sheets-Sheet 2

INVENTOR.
LARS LARSSON
BY Young + Thompson
ATTYS.

July 23, 1968   L. LARSSON   3,393,572
VARIABLE PULLEY

Filed March 16, 1966   3 Sheets-Sheet 3

INVENTOR.
LARS LARSSON
BY Young & Thompson
ATTYS.

United States Patent Office 3,393,572
Patented July 23, 1968

3,393,572
VARIABLE PULLEY
Lars Larsson, Morgongava, Sweden, assignor to Aktiebolaget Westerasmaskiner, Morgongava, Sweden
Filed Mar. 16, 1966, Ser. No. 534,789
Claims priority, application Sweden, Mar. 26, 1965, 3,977/65
4 Claims. (Cl. 74—230.17)

ABSTRACT OF THE DISCLOSURE

A variable pulley in which the belt tension is low at low loading of the driven shaft and in which the belt tension automatically varies in correspondence to the loading of the driven shaft comprises a pair of pulley halves one of which is rigidly secured to the drive shaft and the other of which is rotatable and axially slidable relative to the one half. Tie members of fixed length interconnect the pulley halves and resist axial separation of them, so that upon such axial separation, the tie members cause relative rotation of the pulley halves. In a plane perpendicular to the axis of the pulley, the projection on that plane of the line that interconnects the points of connection of the tie elements is swung away from the pulley axis by an angle of at least 20°; and this angle increases with increasing load as the pulley halves separate, thereby to ensure substantially straight line relationship between transmitted torque and speed of rotation.

---

The present invention concerns a variable V-type pulley which comprises a shaft mounted pulley made up of two halves of which at least one half is rotatable relative to the other half and is also axially movable toward and away from the other half under changes of tension in a V-belt running between the two halves.

In earlier variable pulleys of this type the axially movable pulley half as a rule was pressed against the V-belt either by a spring or a cam. In the first named case the spring had to be powerfully built to make possible the rotation of the shaft when it was driving a heavy load. However, when the loading on the shaft was reduced the movable pulley half was pressed unnecessarily hard against the V-belt due to the powerfully built spring. This resulted in a great amount of wear and also a substantial loss in efficiency. The cam type variable pulley was expensive to manufacture and also caused considerable wear.

One object of the present invention is to achieve a variable pulley in which the belt tension is low at low loading of the driven shaft and in which the belt tension automatically varies in correspondence to the loading of the driven shaft.

Another object is to achieve a simply constructed V-belt pulley wherein the relationship between the transmitted torque and the speed of rotation over the largest possible range of speeds is as near as possible that theoretically desired, i.e. a straight line.

These and other objects are obtained by the present invention as characterized by the accompanying claims.

Figure 1:
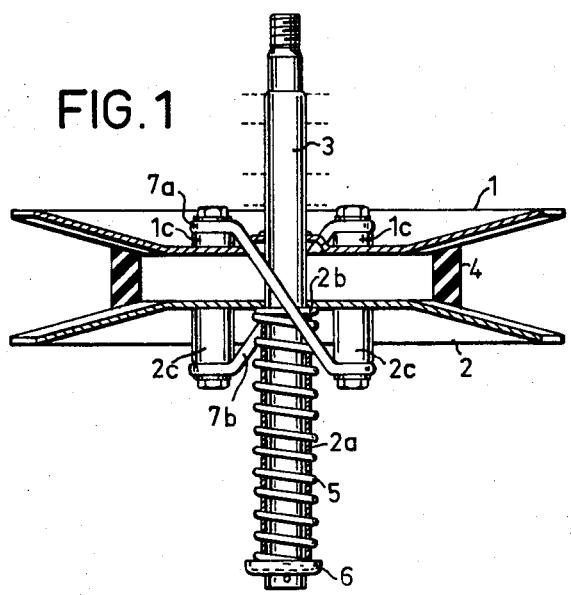
Figure 2:
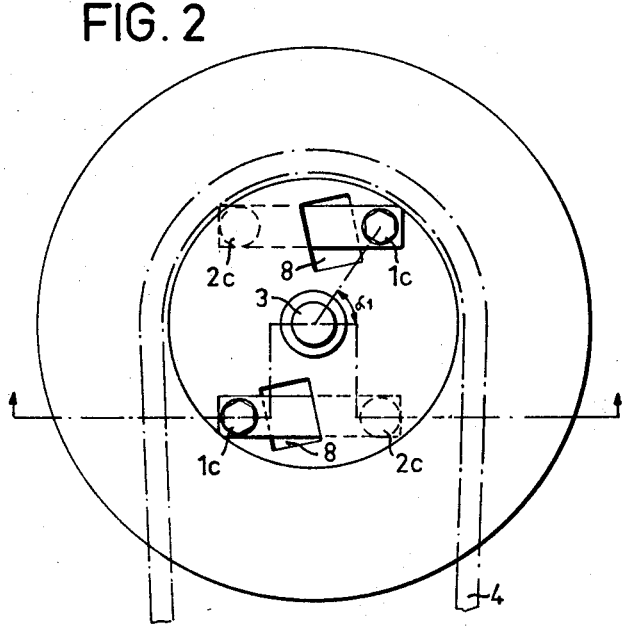
Figure 3:
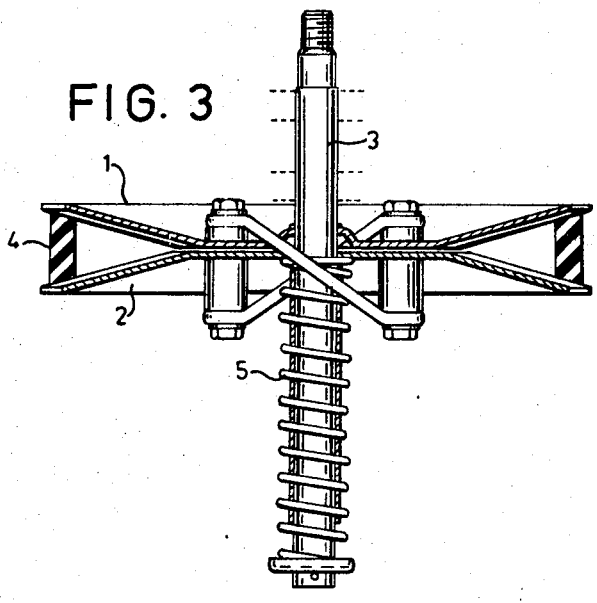
Figure 4:
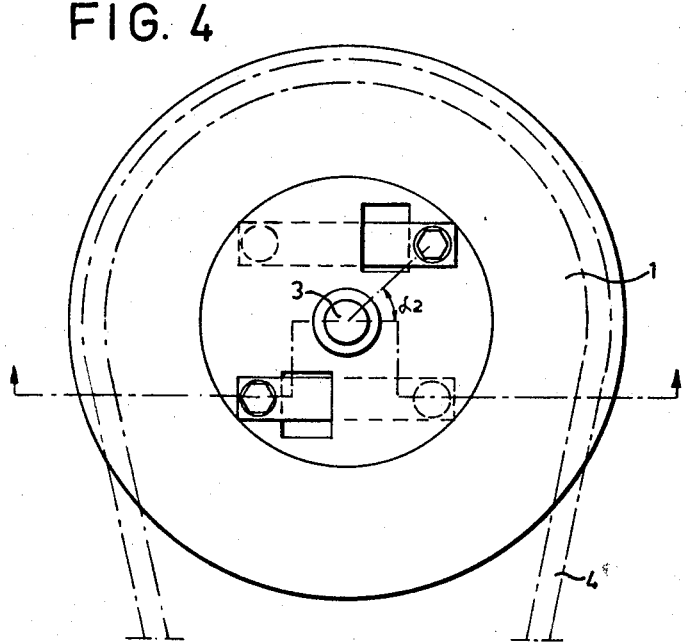
Figure 5:
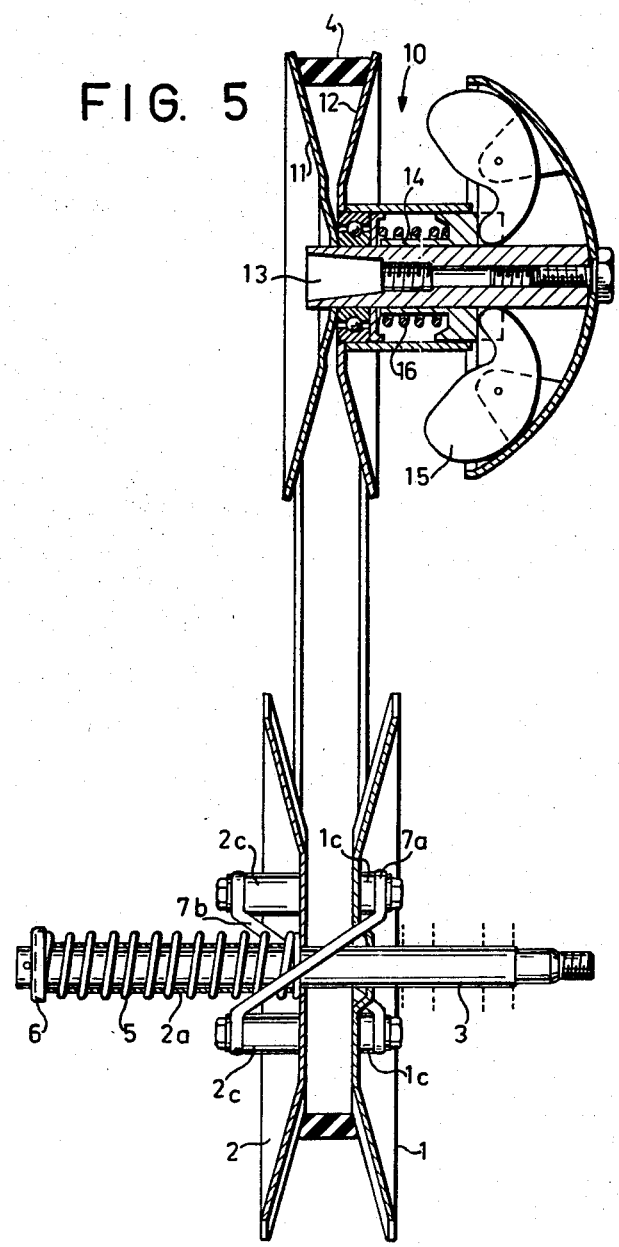

The invention will be described below with reference to the accompanying drawings which show a specific embodiment of the invention. FIG. 1 shows a section view of the variable pulley according to the invention with the lowest transmitted torque and highest speed. FIG. 2 shows a corresponding horizontal view. FIG. 3 shows a pulley with the maximum transmitted torque and lowest speed. FIG. 4 shows a corresponding horizontal view. FIG. 5 shows the variable pulley in connection with a centrifugal governor controlled driving pulley which may for example be arranged with a caterpillar vehicle's engine shaft.

The driven variable pulley shown in FIG. 1 comprises two halves 1, 2 of which the first half 1 is rigidly joined to the pulley's shaft 3. The other half 2 is rotatably and shiftably arranged on the shaft and exhibits a sleeve shaped hub portion 2a which is rotatably and shiftably mounted on shaft 3. A V-belt 4 of textile material runs between the two halves. The displaceable pulley half 2 is acted upon in the axial direction by helical spring 5 which with a comparatively small initial force presses half 2 against V-belt 4. One end of spring 5 bears against a stop washer 6 joined to shaft 3 while the other end of the spring acts on a surface 2b formed on the axially movable pulley half. The movement of hub sleeve 2a outward is also limited by washer 6. Pulley half 1 is furnished with two fastening bosses 1c, and likewise with two fastening bosses 2c for two bandshaped tie elements 7a, 7b which bind the pulley halves together. More than two fastening bosses could be arranged on each pulley half if desired. The halves would have an equal number of bosses and they would preferably be uniformly spaced around the halves.

Tie elements 7a, 7b are bolted fast to the outside of the pulley halves and pass in a diagonal direction through holes 8 in the halves. The tie elements permit, within certain limits, various relative positions of the pulley halves at various speeds and transmitted torque. The two extreme positions are shown in FIGS. 1 and 3, respectively. FIG. 1 shows the position for the highest speed of shaft 3 and FIG. 3 shows the position at the lowest speed. Simultaneously with the axial displacement, the pulley halves rotate relative to each other as is seen in FIGS. 2 and 4, respectively. These figures show how the angle between a horizontal plane containing the centre line of shaft 3 and a second plane also containing the centre line of shaft 3 and passing through the centre of boss 1c is reduced from the value $\alpha_1$ to $\alpha_2$ when the pulley halves are rotated relative to each other. In all possible positions the major portion of each tie element forms an angle with the axis of rotation, i.e. the element does not occupy any position parallel or substantially parallel with the axial direction. The angle formed between the axial direction and the major portion of each tie element when substantially only spring 5 acts on the movable pulley half should exceed 20° and would increase as the tie element contributes to the forces which press against the V-belt.

The initial force with which the spring 5 pressses the movement pulley half 2 against the V-belt is small. When shaft 3 is subjected to a low load essentially only the spring acts and thus the tension in the V-belt 4 is low. If the torque on shaft 3 increases a skidding occurs between belt 4 and pulley halves 1 and 2. However, the skidding occurs mainly between belt 4 and the fixed pulley half 1 from which the resistance is substantially derived. Pulley half 2 which is rotatable relative to shaft 3 then has a tendency to rotate with the belt 4 relative to pulley half 1. Thereby a tension arises in the time elements 7a, 7b which causes the axially displaceable pulley half to press harder against the belt whereby the tension in the belt increases and the transmitted torque increases.

The larger the torque becomes the larger becomes the tension in the driver elements and the pulley halves are pressed tighter against the belt so that skidding ceases.

The device makes possible in a simple way an automatic adjustment of the belt's tension in response to the shaft developed torque. The belt tension imparted to the V-belt when only the helical spring acts on the movable pulley half is suitably adjusted so that it in general corresponds to that for driving the shaft at a minimum load with efficient belt tension. In this situation the tie elements still form an angle with the axis of rotation.

Because of its simplicity and robust construction the variable pulley according to the invention is particularly useful on caterpillar vehicles, for example snow scooters. FIG. 5 shows a centrifugal governor 10 with a pulley for a snow scooter's engine shaft. The pulley comprises two halves 11 and 12. Pulley half 11 is rigidly united with governor shaft 13 while pulley half 12 is axially displaceable and it acted on by centrifugal weights 15 via a sleeve 14 surrounding shaft 13. Sleeve 14 is held against the weights with the help of a helical spring 16. As in earlier figures the V-belt has been given the reference number 4.

The centrifugal governor causes the motor speed throughout a certain torque range to be held within a certain limit. If because of increased strain or increased torque on the driven shaft 3 the motor speed reduces, the V-belt on the driving pulley will move downward in the track between the pulley halves and the belt will simultaneously shift outward on the driven variable pulley. In this way the increased torque is transmitted at reduced driving speed and the snow scooter obtained particularly good driving characteristics.

The invention may be varied in many ways within the scope of the accompanying claims. The principle of the invention is not altered if several belts and corresponding pulley half pairs are mounted beside each other. Nor is it affected by the arrangement used for speed regulation. Thus, for example, it is independent of whether a governor is used or grinding by force occurs. The tie elements may also be belts, bands or the like, suitably of the same material as the V-belt. Also spring and similar means are possible for this purpose. The invention is applicable in both driving and driven pulleys.

Tests have shown that with the variable V-belt pulley according to the invention is particularly large agreement with the theoretically desired result is obtained, that is a straight line relationship between the originating shaft's rotation speed and the transmitted torque throughout almost the entire speed range.

What I claim is:

1. In a power transmission apparatus including a rotating shaft, a variable diameter V-belt pulley having oppositely inclined belt-engaging surfaces, said pulley comprising a first pulley half defining one of said surfaces and fixed on said shaft, a movable pulley half defining the other of said surfaces, means mounting said movable pulley half on said shaft for rotation and axial sliding movement relative thereto to vary the axial spacing of said surface and their rotated positions relative to each other, and tie elements arranged to press said axially movable pulley half more tightly against the belt when the load on the shaft increases, the points of connection between the ends of the tie elements and the pulley halves defining between them a line whose projection on a plane perpendicular to the axis of the pulley forms an angle not less than 20° with the projection on said plane of the line that interconnects one of said connecting points and the axis of the pulley.

2. Apparatus as claimed in claim 1, said tie elements being of constant length and being so disposed that said angle is greater when said pulley halves are relatively far apart and less when said pulley halves are relatively close together.

3. Apparatus as claimed in claim 1, and a spring that acts on said axially movable pulley half to press the movable pulley half against the belt with a force that is small relative to the force exerted by the tie elements when said pulley halves are spaced apart.

4. Apparatus as claimed in claim 1, said tie elements being bands constructed of substantially the same material as the belt.

References Cited

UNITED STATES PATENTS

| | | | |
|---|---|---|---|
| 2,120,383 | 6/1938 | Watson | 74—230.17 |
| 2,475,800 | 7/1949 | Munroe | 74—230.17 |
| 2,641,210 | 9/1953 | Clark | 74—230.17 |
| 2,678,566 | 5/1954 | Oehrli | 74—230.17 |

C. J. HUSAR, *Primary Examiner.*